United States Patent
Yoo et al.

(10) Patent No.: US 11,866,150 B2
(45) Date of Patent: Jan. 9, 2024

(54) PROPELLER SAFETY DEVICE

(71) Applicants: Hyundai Motor Company, Seoul (KR); Kia Corporation, Seoul (KR)

(72) Inventors: Ji Woo Yoo, Incheon (KR); Youn Sic Nam, Daejeon (KR); Keon Woo Kim, Gyeonggi-do (KR); Kwan Ho Moh, Gyeonggi-do (KR); Young Heon Kim, Incheon (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 38 days.

(21) Appl. No.: 17/532,626

(22) Filed: Nov. 22, 2021

(65) Prior Publication Data

US 2022/0289361 A1   Sep. 15, 2022

(30) Foreign Application Priority Data

Mar. 11, 2021 (KR) .................. 10-2021-0032252

(51) Int. Cl.
*B64C 11/00* (2006.01)
*B64D 25/00* (2006.01)

(52) U.S. Cl.
CPC ............ *B64C 11/003* (2013.01); *B64D 25/00* (2013.01)

(58) Field of Classification Search
CPC ...... B64D 27/24; B64D 27/50; B64D 27/022; B64D 27/006; B64C 11/003; B64C 11/28; B64C 11/00; B64C 11/24; B64C 3/56; B64C 25/00; F03D 7/0236; F05B 2240/313; F05B 2240/31; F05B 2240/2021; B64U 20/50; B64U 30/293; F04D 29/323
See application file for complete search history.

(56) References Cited

U.S. PATENT DOCUMENTS

| | | | | |
|---|---|---|---|---|
| 2,088,255 A * | 7/1937 | Adams | .................. | B64C 11/003 416/89 |
| 2,749,059 A * | 6/1956 | Meyers | .................... | B64C 27/30 416/88 |
| 3,128,829 A * | 4/1964 | Young | ................... | B64C 11/003 416/88 |
| 6,902,370 B2 * | 6/2005 | Dawson | ................ | F03D 7/0236 416/DIG. 4 |
| 6,972,498 B2 * | 12/2005 | Jamieson | .............. | F03D 7/0236 290/55 |
| 8,231,347 B2 * | 7/2012 | Dawson | ................ | F03D 1/0675 416/211 |
| 8,469,307 B2 * | 6/2013 | Arlton | ..................... | B64C 27/10 244/17.23 |

(Continued)

FOREIGN PATENT DOCUMENTS

CN        205311899 U     6/2016
CN        111252237 A     6/2020
(Continued)

*Primary Examiner* — Justin D Seabe
*Assistant Examiner* — Joshua R Beebe
(74) *Attorney, Agent, or Firm* — Fox Rothschild LLP

(57) ABSTRACT

A propeller safety device is provided. The propeller safety device is configured to insert a moving part of a propeller into a fixed part during a crash of an air mobility to allow a reduction in the total length of the propeller, thereby preventing the propeller from hitting the ground. Accordingly, a secondary accident due to fragments formed when the rotating propeller hits the ground is prevented.

14 Claims, 9 Drawing Sheets

(56) References Cited

U.S. PATENT DOCUMENTS

| | | | |
|---|---|---|---|
| 2001/0019089 A1* | 9/2001 | Happ | B64D 25/02 |
| | | | 244/122 AG |
| 2010/0310374 A1* | 12/2010 | Dehlsen | F03D 7/0232 |
| | | | 416/87 |
| 2010/0329866 A1* | 12/2010 | Hunt | B63B 21/50 |
| | | | 416/159 |
| 2012/0280091 A1* | 11/2012 | Saiz | B64C 27/30 |
| | | | 244/6 |
| 2016/0031556 A1* | 2/2016 | Bevirt | B64C 27/30 |
| | | | 416/131 |
| 2016/0167778 A1* | 6/2016 | Meringer | B64U 10/10 |
| | | | 244/17.11 |

FOREIGN PATENT DOCUMENTS

| | | | |
|---|---|---|---|
| KR | 10-2020-0104582 A | 9/2020 | |
| WO | WO-2012134462 A1 * | 10/2012 | B64C 27/006 |

* cited by examiner

PROPELLER SAFETY DEVICE

CROSS REFERENCE TO RELATED APPLICATION

The present application claims priority to Korean Patent Application No. 10-2021-0032252, filed Mar. 11, 2021, the entire contents of which is incorporated herein for all purposes by this reference.

BACKGROUND

Field of the Disclosure

The present disclosure relates to a propeller safety device and, more particularly, to a propeller safety device that prevents secondary accidents that may be caused when fragments of a broken propeller are scattered during a crash of an air mobility.

Description of the Related Art

Recently, an air mobility that can be used in various fields, such as cargo containers and medical transportation, has been developed, and energy efficiency and stabilization of the air mobility has been developed to reach the stage of practical use. The air mobility flies using maneuvering of a propeller, so stability is essentially required against a crash. Accordingly, the air mobility selectively controls the maneuvering of the propeller in response to a crash of the air mobility, but the air mobility does not have a safety measure for a last situation of the crash of the air mobility. As an example, during a crash or collision of the air mobility, each rotating propeller hits the ground, and the rapidly rotating propeller could be broken generating fragments by hitting the ground and the fragments are scattered around a crash site thus causing a secondary accident.

The foregoing is intended merely to aid in the understanding of the background of the present disclosure, and is not intended to mean that the present disclosure falls within the purview of the related art that is already known to those skilled in the art.

SUMMARY

Accordingly, the present disclosure has been made keeping in mind the above problem occurring in the related art, and the present disclosure is intended to propose a propeller safety device capable of keeping a propeller during a crash of an air mobility to prevent secondary accidents that may be caused when the propeller hits the ground and fragments of the propeller are scattered.

In order to achieve the above objective, the propeller safety device according to the present disclosure may include: a shaft generating rotating power; a fixed part having a sliding space therein, the fixed part having a first end coupled to the shaft, and a second end configured to be open to communicate with the sliding space; a moving part provided at the second end of the fixed part and configured to be pulled out of and inserted into the sliding space, and to form a blade together with the fixed part when the moving part is pulled out of the sliding space; and a driving module provided at the sliding space of the fixed part and connected to the moving part, and configured to allow the moving part to be inserted into the sliding space when a signal indicative of a crash of an air mobility is input.

The fixed part may include a fixed portion located in the sliding space of the fixed part and to which the driving module may be mounted, and the moving part may have a hollow portion and an open first end to insert the fixed portion of the fixed part into the hollow portion of the moving part when the moving part is inserted into the sliding space. The fixed part may include at least one support portion protruding inward from a circumferential surface of the sliding space and connected to the fixed portion, and the moving part may include a guide slit, at an outer circumferential surface thereof, into which the support portion may be inserted. The support portion of the fixed part may be extended straightly along a longitudinal direction of the sliding space.

The driving module may include: a piston portion passing through the fixed portion such that a first end thereof may be movably placed in the sliding space and a second end thereof may be connected to the moving part; and a launch portion provided at the fixed portion, and configured to generate explosive force when the signal indicative of the crash of the air mobility is input and thereby to allow the first end of the piston portion to be moved toward the first part of the fixed part, to insert the moving part into the sliding space of the fixed part.

The fixed portion may be configured to close the open portion at the second end of the fixed part to seal the sliding space. The piston portion have the second end thereof connected to a second end of the moving part and the first end thereof may be placed in the sliding space, and be located at one side of the sliding space when the moving part is pulled out of the sliding space. The launch portion may be mounted to the fixed portion in the sliding space and configured to generate a gas when the signal indicative of the crash of the air mobility is input and thereby to allow the first end of the piston portion to be moved.

The driving module may include: a moving portion passing through the fixed portion such that a first end thereof may be movably placed in the sliding space and a second end thereof may be connected to the moving part; an elastic portion provided between the first end of the moving portion and the fixed portion and configured to be transformable elastically; and a stopper disposed in the sliding space of the fixed part, configured to fix a position of the moving portion by being brought into contact with the first end of the moving portion when the moving part is pulled out of the sliding space and the elastic portion is compressed, and to be separated from the first end of the moving part when the signal indicative of the crash of the air mobility is input.

The moving portion may have the second end connected to a second end of the moving part and the first end thereof may be placed in the sliding space and located at one side of the sliding space when the moving part is pulled out of the sliding space. The elastic portion may be a tension spring having a first end connected to the second end of the moving portion and a second end connected to the fixed portion. The second end of the fixed part and a first end of the moving part may be configured to be connected to each other in a fastening manner to maintain a pulled-out state of the moving part.

The propeller safety device may include: a controller configured to receive a flight condition of the air mobility and to determine whether the air mobility has crashed and to transmit a signal indicative of a crash of the air mobility to the driving module in response to determining that the air mobility has crashed. The controller may be configured to receive altitude information of the air mobility and to transmit the signal indicative of the crash of the air mobility to the driving module when an altitude of the air mobility is equal to or less than a preset altitude.

The controller may be configured to further receive information about fall velocity and posture of the air mobility, to pre-store a preset velocity corresponding to the fall velocity and a preset angle corresponding to the posture of the air mobility, and when the fall velocity is equal to or greater than the preset velocity and the posture of the air mobility is equal to or greater than the preset angle, the controller may be configured to transmit the signal indicative of the crash of the air mobility to the driving module.

In the propeller safety device having the structure described above, the moving part constituting the propeller may be inserted into the fixed part during a crash of the air mobility to allow a reduction in the total length of the propeller and to prevent the propeller from hitting the ground. Accordingly, it is possible to prevent secondary accidents that may be caused by fragments formed when the rotating propeller hits the ground.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION

Hereinbelow, a propeller safety device according to an exemplary embodiment of the present disclosure will be described with respect to accompanying drawings.

Figure 1:
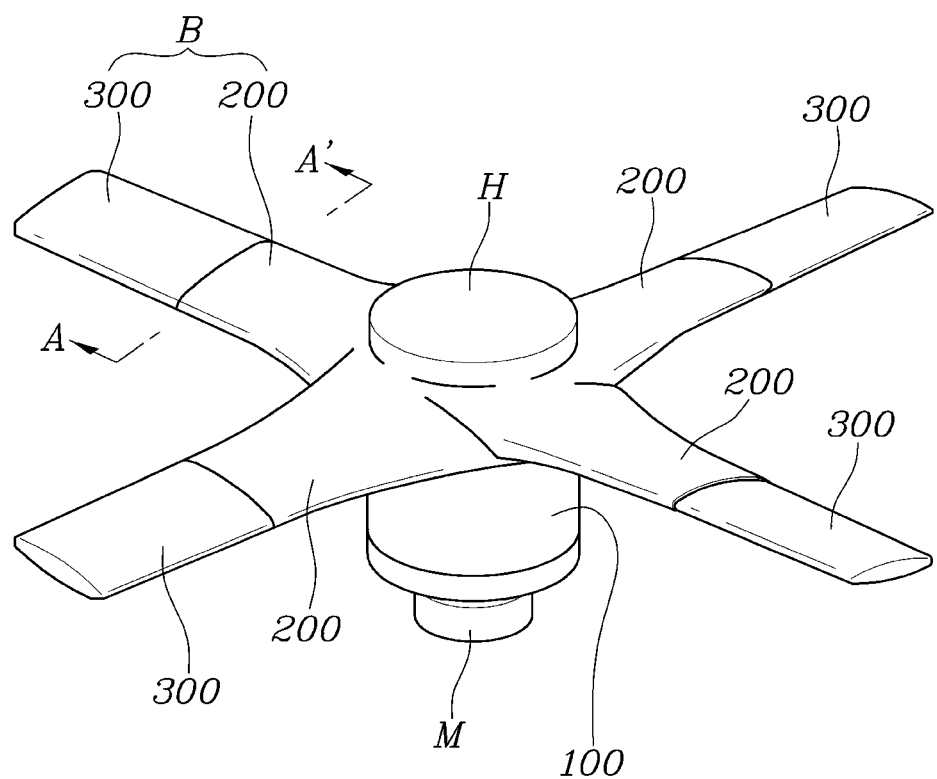
FIG. 1 is a view showing a propeller safety device according to the present disclosure.
Figure 2:
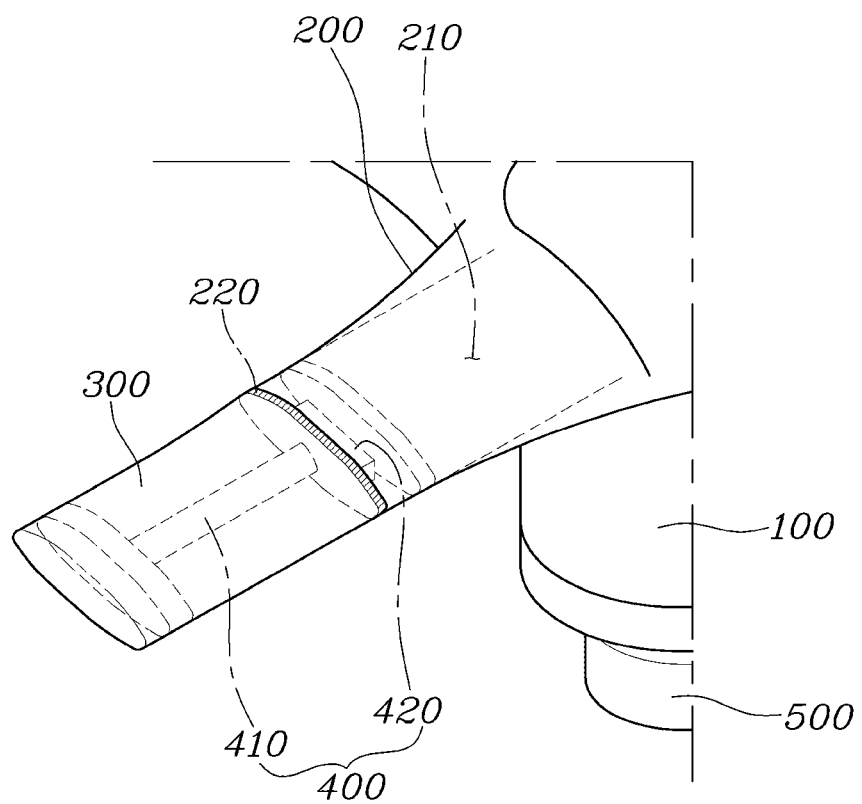
FIG. 2 is a view showing a moving part of the propeller safety device shown in FIG. 1, wherein the moving part is in a pulled-out state.
Figure 3:
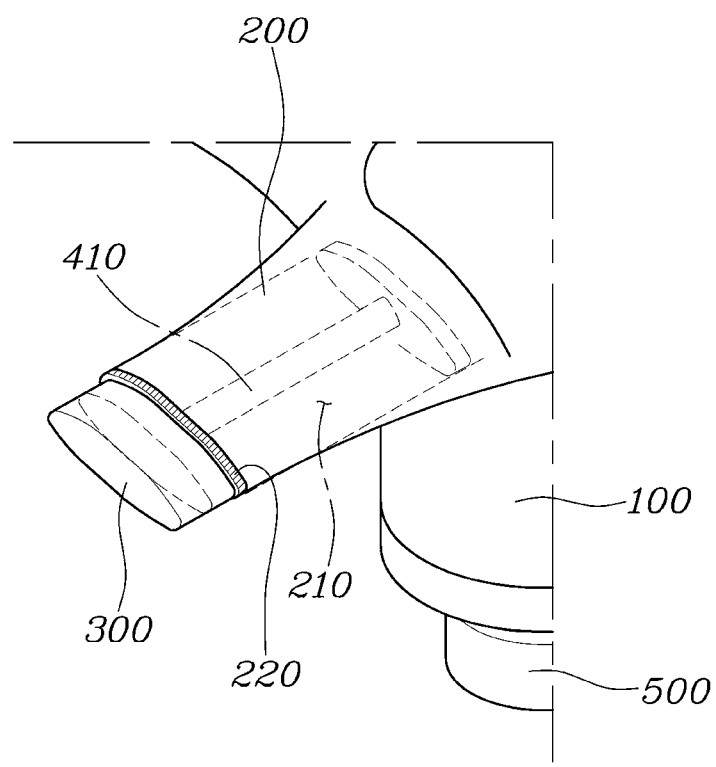
FIG. 3 is a view showing the moving part of the propeller safety device shown in FIG. 1, wherein the moving part is in an inserted state.
Figure 4:
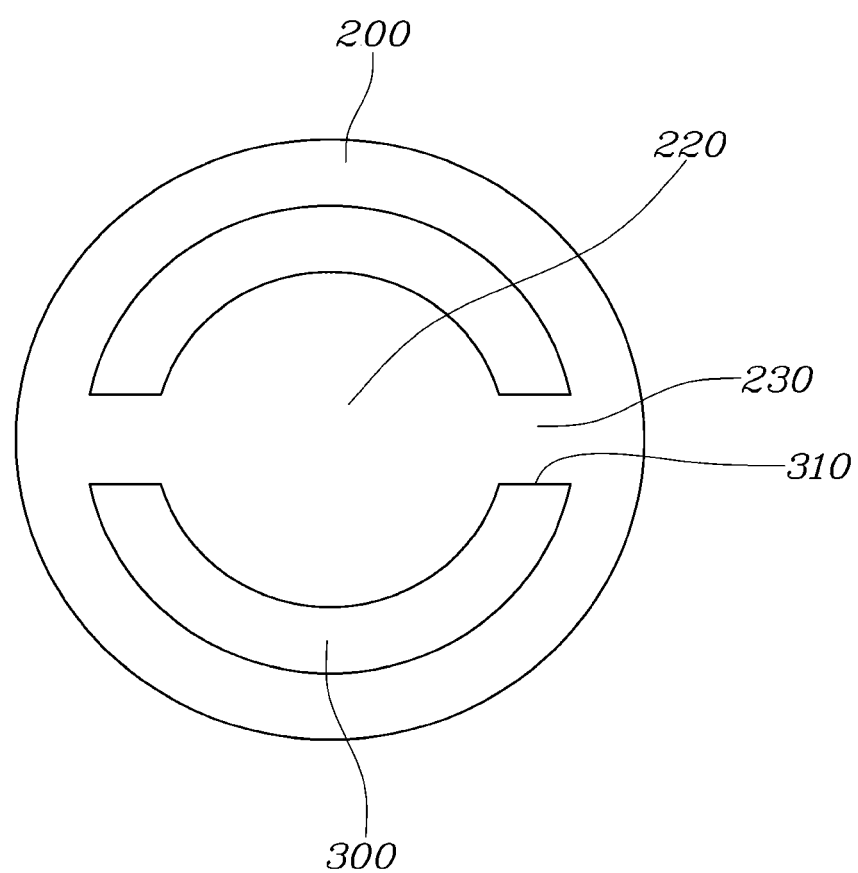
FIG. 4 is a sectional view taken along line A-A' shown in FIG. 1.
Figure 5:
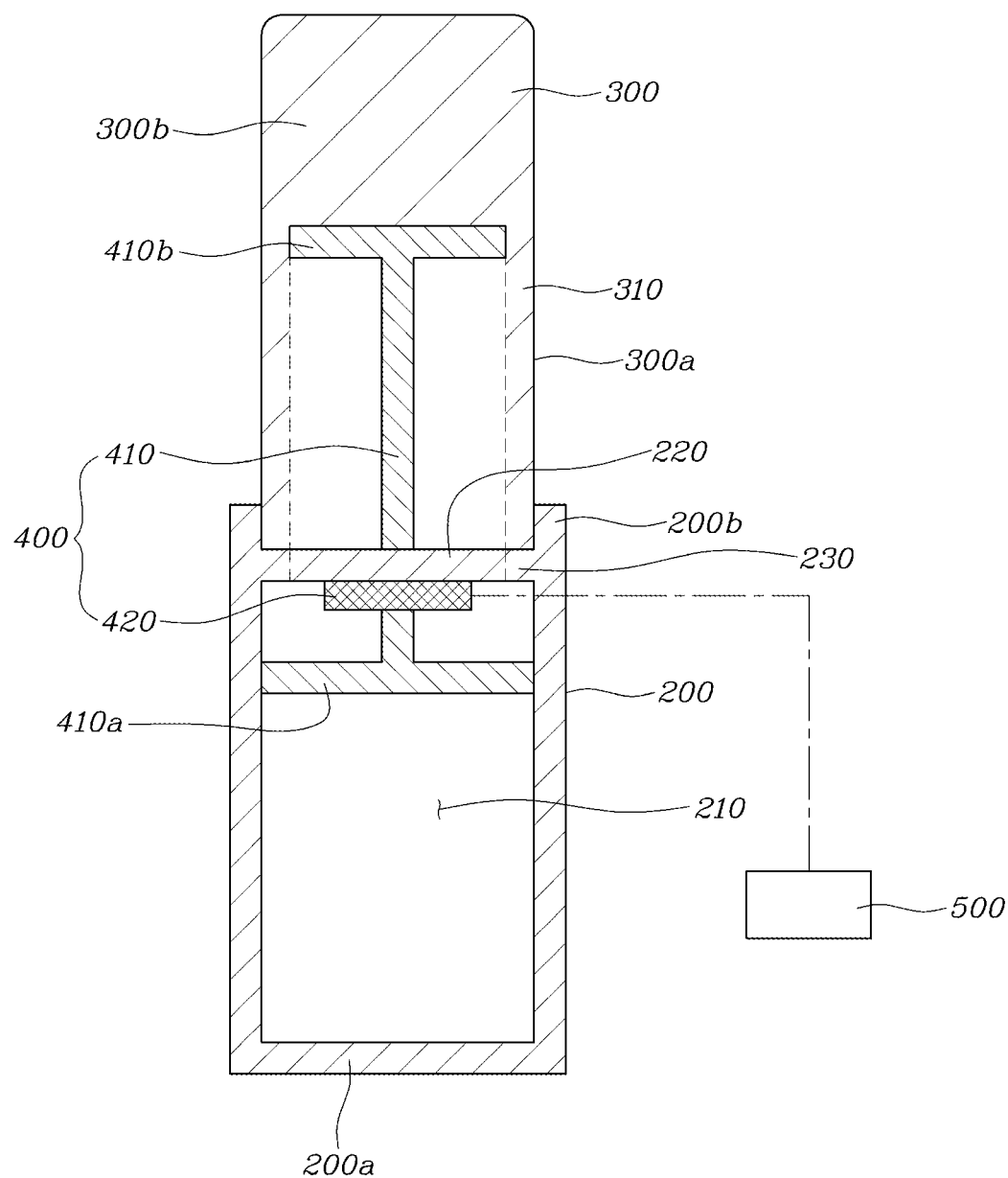
FIG. 5 is a view showing a pre-operation state of a driving module according to an embodiment.
Figure 6:
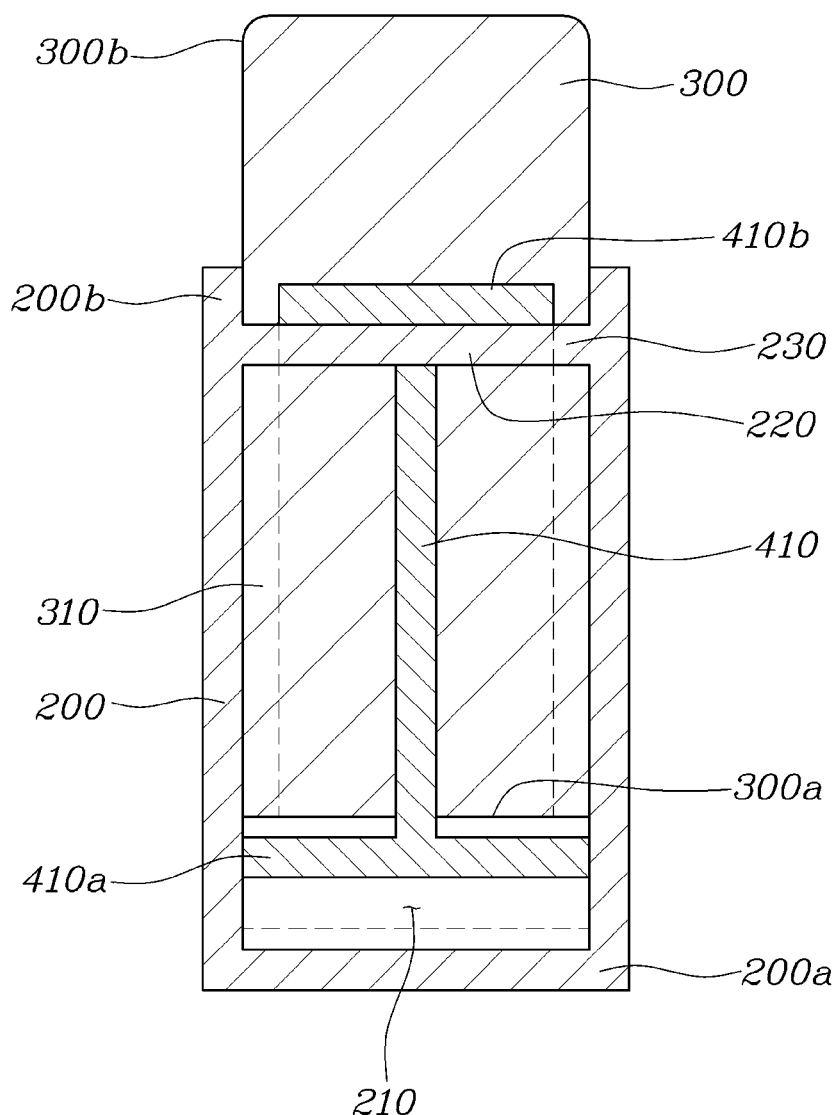
FIG. 6 is a view showing a post-operation state of the driving module according to the embodiment.
Figure 7:
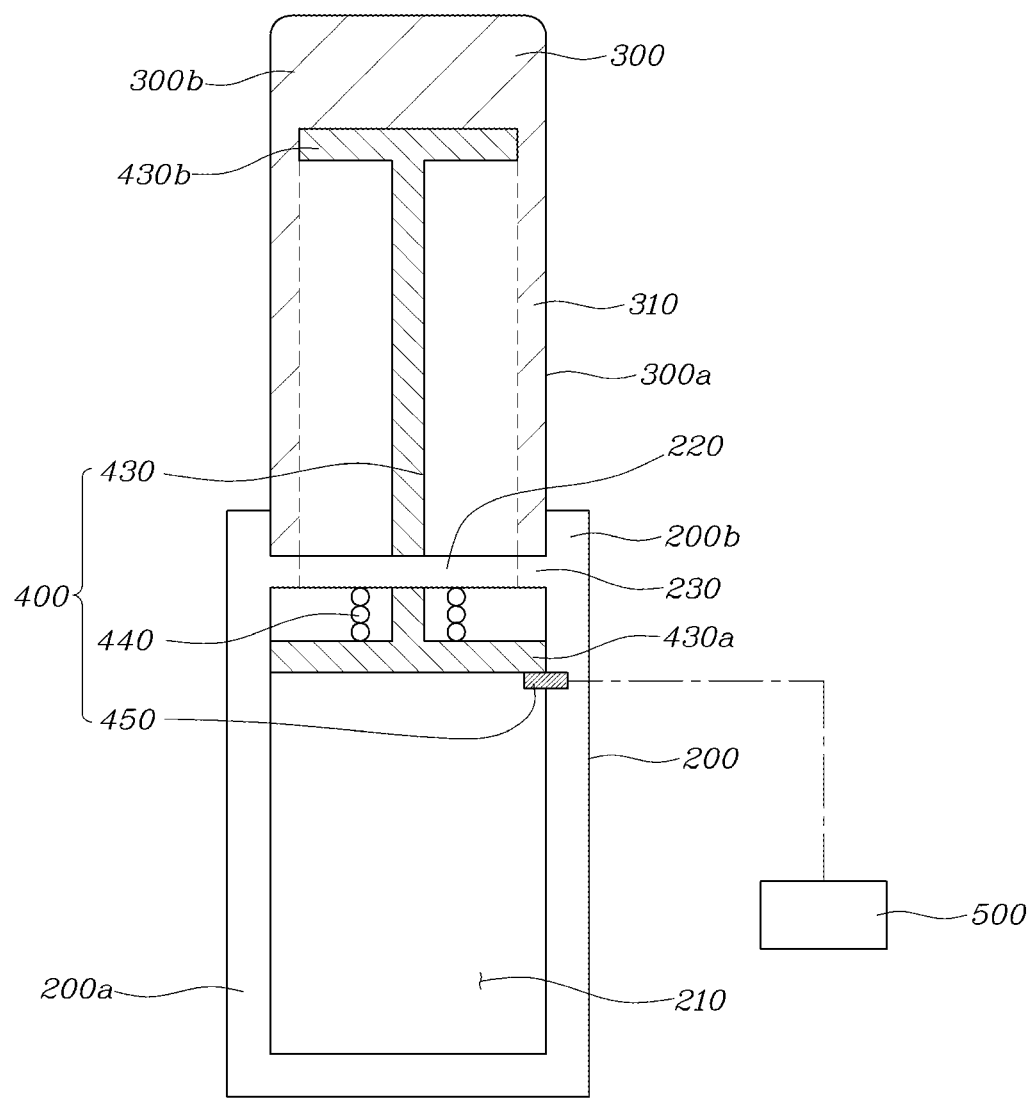
FIG. 7 is a view showing a pre-operation state of a driving module according to another embodiment.
Figure 8:
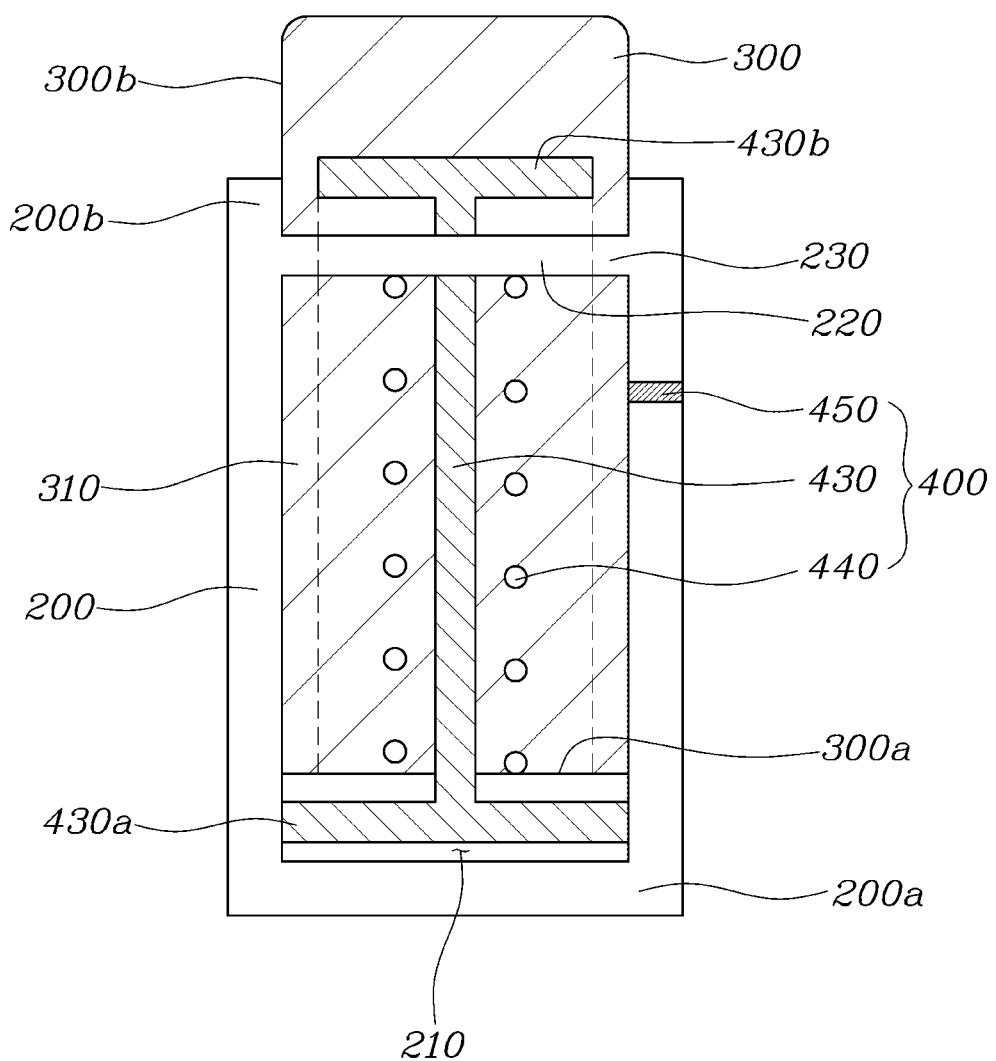
FIG. 8 is a view showing a post-operation state of the driving module according to the another embodiment.
Figure 9:
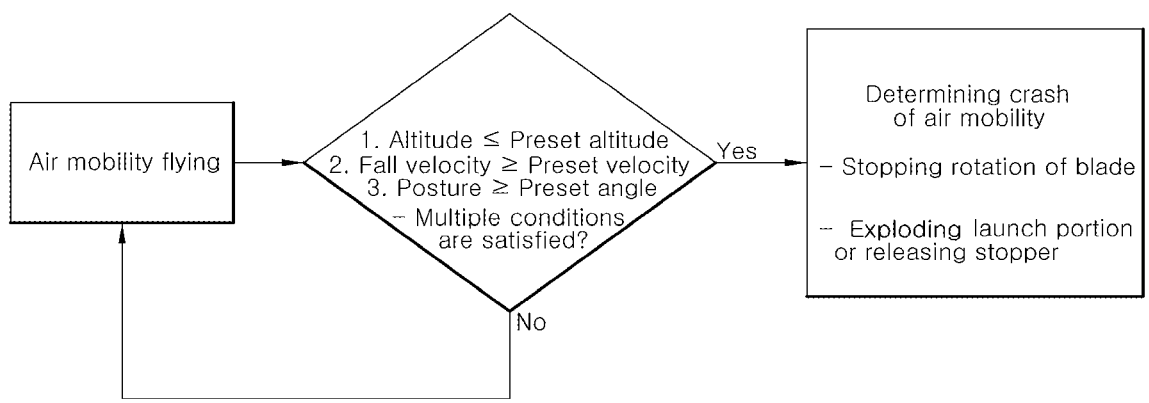
FIG. 9 is a flowchart showing the control of the propeller safety device.

FIG. 1 is a view showing the propeller safety device according to the present disclosure. FIG. 2 is a view showing a moving part of the propeller safety device shown in FIG. 1, wherein the moving part is in a pulled-out state. FIG. 3 is a view showing the moving part of the propeller safety device shown in FIG. 1, wherein the moving part is in an inserted state. FIG. 4 is a sectional view taken along line A-A' shown in FIG. 1. FIG. 5 is a view showing a pre-operation state of a driving module according to an embodiment. FIG. 6 is a view showing a post-operation state of the driving module according to the embodiment. FIG. 7 is a view showing a pre-operation state of a driving module according to another embodiment. FIG. 8 is a view showing a post-operation state of the driving module according to the embodiment of FIG. 7. FIG. 9 is a flowchart showing the control of the propeller safety device.

As shown in FIGS. 1 to 3, the propeller safety device according to the present disclosure may include: a shaft 100 generating rotating power; a fixed part 200 having a sliding space 210 therein, having a first end 200a thereof coupled to the shaft 100, and having a second end 200b configured to be open to communicate with the sliding space 210; a moving part 300 provided at the second end 200b of the fixed part 200 and configured to be pulled out of and inserted into the sliding space 210, and that forms a blade together with the fixed part 200 when the moving part is pulled out of the sliding space; and a driving module 400 provided at the sliding space 210 of the fixed part 200 and connected to the moving part 300, and that allows the moving part 300 to be inserted into the sliding space 210 when a signal indicative of a crash of an air mobility is input.

The shaft 100 may be mounted to a driving motor (M) and rotate, and a hub (H) to which the fixed part 200 is coupled may be provided. The fixed part 200 and the moving part 300 form one blade and a plurality of blades are provided to generate thrust during rotation of the shaft 100. The fixed part 200 may be coupled to the shaft 100 and may be configured to rotate with the shaft 100, and has the sliding space 210 therein to allow the moving part 300 to be movable. Accordingly, the second end 200b of the fixed part 200 may be formed open toward the sliding space 210 so that the moving part 300 may be movable through the second end 200b of the fixed part 200 into the sliding space 210. When the fixed part 200 and the moving part 300 form an exterior shaped into one blade, thrust due to the rotation is generated when the moving part 300 is pulled out of the sliding space 210 of the fixed part 200. In addition, when the moving part 300 is inserted into the sliding space 210, a total length of the blade is reduced.

Meanwhile, the driving module 400 is provided in the fixed part 200 so that the insertion motion of the moving part 300 is performed selectively. The driving module 400 may be configured to receive the signal indicative of a crash of an air mobility based on information about flight conditions of the air mobility, and when the signal indicative of the crash of the air mobility is input, the driving module 400 allows the moving part 300 to be inserted into the sliding space 210 to reduce the total length of the blade. As the total length of the blade is reduced, it is possible to prevent scattering fragments of the blade broken when the rotating blade hits the ground or an accident that may be caused by the rotation of the blade.

When the present disclosure is described in detail, the fixed part 200 may include a fixed portion 220 located in the sliding space 210 and to which the driving module 400 is provided, and the moving part 300 has a hollow portion and has an open first end 300a to insert the fixed portion 220 into the hollow portion when the moving part 300 is inserted into the sliding space 210. In other words, as the fixed part 200 has the fixed portion 220 therein, the driving module 400 may be installed with the fixed portion 220 as a medium. As the moving part 300 has the hollow portion, the weight of the moving part is reduced. Furthermore, as the moving part 300 has the open first end 300a, when the moving part is inserted into the sliding space 210, the insertion motion of the moving part 300 may be performed while the fixed portion 220 is inserted into the hollow portion.

As shown in FIG. 4, the fixed part 200 may include at least one support portion 230 protruding inward from a circumferential surface of the sliding space 210 and connected to the fixed portion 220, and the moving part 300 may have a guide slit 310, at an outer circumferential surface thereof, into which the support portion 230 is inserted. Meanwhile, FIG. 4 is illustrated based on a circular shape, but it may actually be elliptical shape.

As described above, in the fixed part 200, the support portion 230 protrudes from the circumferential surface of the sliding space 210 and the fixed portion 220 may be coupled to the support portion 230, so that, in the sliding space 210, the fixed portion 220 may be located in the hollow portion of the moving part 300. The support portion 230 may include at least a pair of support portions to secure support hardness of the fixed portion 220, and may include a plurality of support portions according to required hardness.

Meanwhile, the guide slit 310 into which the support portion 230 is inserted may be provided on the outer circumferential surface of the moving part 300. Therefore, during insertion of the moving part 300, the support portion 230 may be inserted into the guide slit 310, thereby efficiently performing the insertion motion of the moving part 300. The guide slit 310 may be extended from a second end 300b to the first end 300a by a moving distance when the moving part 300 is inserted.

The support portion 230 may be extended in a straight line along a longitudinal direction of the sliding space 210. Accordingly, the guide slit 310 of the moving part 300 receiving the support portion 230 may be coupled to the support portion 230, to stably mount the moving part 300 to the fixed part 200. Furthermore, the movement of the moving part 300 may be guided along the extended direction of the support portion 230, to perform the insertion motion more stably. The guide slit 310 may be formed at upper and lower ends of the moving part 300 while avoiding a rotating direction of the moving part 300. Accordingly, air resistance due to the guide slit 310 when the moving part 300 rotates may be minimized. The support portion 230 may be provided at upper and lower ends of the fixed part 200 to be connected to the guide slit 310.

Meanwhile, the second end 200b of the fixed part 200 and the first end 300a of the moving part 300 may be connected to each other in a fastening manner to maintain the pulled-out state of the moving part 300. In other words, to maintain the pulled-out state of the moving part 300 from the fixed part 200, the second end 200b of the fixed part 200 and the first end 300a of the moving part 300 have a fastening structure for the fastening between the second end 200b of the fixed part 200 and the first end 300a of the moving part 300. The fastening structure may be formed by a protrusion and groove connection structure or a hooking structure. As an example, the second end 200b of the fixed part 200 has a protrusion on an inner circumferential surface of the sliding space 210, and the second end 300b of the moving part 300 has a groove corresponding to the protrusion.

As the protrusion is inserted into and then locked to the groove when the moving part 300 is pulled out of the sliding space 210 of the fixed part 200, the moving part 300 may maintain the pulled-out state from the fixed part 200. In this state, when the insertion motion of the moving part 300 is performed, the moving part 300 may be moved into the sliding space 210 while buckling the protrusion of the fixed part 200. In the pulled-out state of the moving part 300, the first end 300a of the moving part 300 and the second end 200b of the fixed part 200 may use various methods as the fastening structure other than the protrusion and groove method.

Hereinbelow, the driving module 400 according to various embodiments will be described.

As an embodiment, as shown in FIGS. 5 and 6, the driving module 400 may include: a piston portion 410 passing through the fixed portion 220 to moveably place a first end 410a in the sliding space 210 and connect a second end 410b to the moving part 300; and a launch portion 420 may be provided at the fixed portion 220, and configured to generate explosive force when the signal indicative of a crash of the air mobility is input and to allow the first end 410a of the piston portion 410 to be moved toward the first end 200a of the fixed part 200, to insert the moving part 300 into the sliding space 210 of the fixed part 200.

In other words, the driving module 400 may include the piston portion 410 and the launch portion 420, and as the piston portion 410 is moved due to the explosive force of the launch portion 420, the insertion motion of the moving part 300 connected to the piston portion 410 may be performed. In particular, the piston portion 410 may be extended along the longitudinal direction of the sliding space 210, and may be moved in the longitudinal direction of the sliding space 210 by passing through the fixed portion 220.

The piston portion 410 may have the first end 410a thereof placed in the sliding space 210 and operated in conjunction with the launch portion 420 and the second end 410b may be connected to the moving part 300. Accordingly, when the launch portion 420 generates the explosive force by the input signal indicative of a crash of the air mobility, the first end 410a of the piston portion 410 receives the explosive force and is moved toward the first end 200a of the fixed part 200. The moving part 300 is connected to the second end 410b of the piston portion 410 and thus moved toward the second end 200b of the fixed part 200 together with the piston portion 410, and thus, the insertion motion of the moving part 300 may be performed while the moving part 300 is inserted into the sliding space 210.

For this, the fixed portion 220 may be configured to close the open portion at the second end 200b of the fixed part 200 to thus seal the sliding space 210. The launch portion 420 may be provided at the fixed portion 220 in the sliding space 210, and configured to generate a gas when the signal indicative of a crash of the air mobility is input and to allow the first end 410a of the piston portion 410 to be moved. The launch portion 420 may be configured to generate the explosive force when a gas is generated by burning instantly a gas generating agent by an ignition device.

The fixed portion 220 may be arranged at the second end 200b of the fixed part 200 and configured to close the open portion of the second end 200b, to prevent the gas generated from the launch portion 420 from circulating toward the moving part 300. In other words, the sliding space 210 of the fixed part 200 may be sealed by the fixed portion 220, and thus the gas generated by the operation of the launch portion 420 may be prevented, by the fixed portion 220, from being moved toward the moving part 300. The explosive force acts toward the second end 200b of the fixed part 200, to transmit the explosive force to the piston portion 410 and the piston portion 410 may be moved toward the second end 200b of the fixed part 200 together with the moving part 300.

The piston portion 410 has the second end 410b connected to the second end 300b of the moving part 300 and the first end 410a placed in the sliding space 210, in particular, located at one side in the sliding space 210 when the moving part 300 is pulled out of the sliding space 210, so that a movable length of the moving part 300 may be secured by the length of the piston portion 410 or the sliding space 210. Furthermore, the piston portion 410 is formed such that the first end 410a corresponds to a shape of the sliding space 210 to transmit the explosive force generated by the launch portion 420, and the piston portion 410 is formed such that the second end 410*b* corresponds to the inside of the hollow portion of the moving part 300 to secure coupling force between the piston portion and the moving part 300.

As described above, in the driving module 400 according to the embodiment, as the moving part 300 is moved together with the piston portion 410 by the explosive force generated from the launch portion 420, insertion speed of the moving part 300 increases to allow rapid reaction to a crash of the air mobility.

Meanwhile, as another embodiment, as shown in FIGS. 7 and 8, the driving module 400 may include: a moving portion 430 passing through the fixed portion 220 such that a first end 430*a* is movably placed in the sliding space 210 and a second end 430*b* is connected to the moving part 300; an elastic portion 440 provided between the first end 430*a* of the moving portion 430 and the fixed portion 220 and configured to be transformable elastically; and a stopper 450 disposed in the sliding space 210 of the fixed part 200, and configured to be brought into contact with the first end 430*a* of the moving portion 430 when the moving part 300 is pulled out of the sliding space 210 and the elastic portion 440 is compressed, thereby fixing a position of the moving portion 430, and to be separated from the first end 430*a* of the moving portion 430 when the signal indicative of a crash of the air mobility is input.

In other words, the driving module 400 includes the moving portion 430, the elastic portion 440, and the stopper 450. The driving module 400 is configured such that, the stopper 450 restrains movement of the moving portion 430 when the elastic portion 440 is compressed, and the moving portion 430 is moved due to elastic force of the elastic portion 440 during separation of the stopper 450 from the moving portion 430 to allow the insertion motion of the moving part 300 connected to the moving portion 430. In particular, the moving portion 430 may be extended along the longitudinal direction of the sliding space 210, and may pass through the fixed portion 220 to be moved in the longitudinal direction of the sliding space 210.

The moving portion 430 may be operated in conjunction with the elastic portion 440 as the first end 430*a* thereof is placed in the sliding space 210, and the second end 430*b* thereof is connected to the moving part 300. Furthermore, the elastic portion 440 may be disposed between the first end 430*a* of the moving portion 430 and the fixed portion 220 and may be configured to generate the elastic force.

Accordingly, in a state where the moving part 300 is pulled out of the fixed part 200, the elastic portion 440 may be compressed between the first end 430*a* of the moving portion 430 and the fixed portion 220 and the stopper 450 support the first end 430*a* of the moving portion 430 to maintain the compressed state of the elastic portion 440. Herein, when the signal indicative of a crash of the air mobility is input to the stopper 450, the stopper 450 may be separated from the first end 430*a* of the moving portion 430 and the moving portion 430 may be moved toward the first end 200*a* of the fixed part 200 due to the elastic force of the elastic portion 440. Whereby, the second end 430*b* of the moving portion 430 is connected to the moving part 300 and the moving part 300 is moved toward the second end 200*b* of the fixed part 200 together with the piston portion 410 and thus, the movement of the moving part 300 inserted into the sliding space 210 may be performed.

For this, the moving portion 430 has the second end 430*b* connected to the second end 300*b* of the moving part 300 and the first end 430*a* placed in the sliding space 210, in particular, located at one side in the sliding space 210 during the pulled-out state of the moving part 300, and thus, the movable length of the moving part 300 may be secured by the length of the moving portion 430 or the sliding space 210. Furthermore, the moving portion 430 may be formed with the first end 430*a* corresponding to the shape of the sliding space 210 to allow the elastic portion 440 to be stably supported, and the second end 430*b* corresponding to the inside of the hollow portion of the moving part 300 to secure the coupling force between the piston portion and the moving part 300.

The elastic portion 440 may be a tension spring having a first end 440*a* connected to the second end 430*b* of the moving portion 430 and a second end 440*b* connected to the fixed portion 220. As described above, the elastic portion 440 may include the tension spring and may be configured to generate the elastic force, to thus perform the insertion motion of moving part 300 due to the moving portion 430 moved by the elastic force of the elastic portion 440. The stopper 450 may include a solenoid, and may be separated from the moving portion 430 while performing the insertion motion when the signal is input.

As described above, during a crash or collision of the air mobility, the driving module 400 according to the another embodiment may be operated such that the stopper 450 is separated from the moving portion 430 and the compressed elastic portion 440 generates the elastic force, to thus move the moving portion 430 with the moving part 300.

Meanwhile, the present disclosure may include a controller 500 configured to receive a flight condition of the air mobility and determine whether the air mobility has crashed, and may be configured to transmit the signal indicative of a crash of the air mobility to the driving module 400 in response to determining that the air mobility has crashed. The controller 500 may be configured to collect information about the flight conditions of the air mobility using a sensor or a communication device mounted to the air mobility, and gather the information to determine whether the air mobility has crashed.

As shown in FIG. 9, the controller 500 may be configured to receive altitude information of the air mobility and transmit the signal indicative of the crash of air mobility to the driving module 400 when an altitude of the air mobility is equal to or less than a preset altitude.

In the present disclosure, operation for inserting the moving part 300 may be preferably performed before the air mobility crashes and finally reaches the ground. In other words, the controller 500 may be configured to maximally control the flight of the air mobility by the rotation of each blade when an altitude of the air mobility is greater than the preset altitude, and when the controller determines that the air mobility hits the ground as the altitude of the air mobility is less than the preset altitude, the controller may be configured to operate the moving part 300 to be inserted to prevent a secondary accident due to the rotation of the blade. In particular, the controller 500 may be configured to restrain the insertion motion of the moving part 300 before the altitude of the air mobility reaches an altitude below the preset altitude to maintain flight control due to the rotation of the blade, and the controller 500 may be configured to operate the moving part 300 to be inserted immediately before the air mobility finally hits the ground to prevent secondary accidents due to the rotation of the blade.

The controller 500 may be configured to receive information about decreasing velocity and posture information of the air mobility, and pre-store a preset velocity corresponding to the falling or decreasing velocity and a preset angle corresponding to the posture of the air mobility. When a falling velocity is equal to or greater than the preset velocity and a posture of the air mobility is equal to or greater than the preset angle, the controller may be configured to transmit the signal indicative of a crash of the air mobility to the driving module 400.

As described above, the controller 500 may be configured to further determine a crash situation of the air mobility in response to the falling velocity and the posture information of the air mobility. When an altitude of the air mobility is equal to or less than the preset altitude, when the falling velocity is stabilized by the flight control of the air mobility in advance, the controller allows the moving part 300 to maintain the pulled-out state so that the air mobility may safely land. Furthermore, when the posture of the air mobility is inclined equal to or greater than the preset angle, the blade may touch the ground first, so it may be determined whether the signal is transmitted in response to the posture of the air mobility.

As described above, the controller 500 may be configured to collect or gather information about altitude, falling velocity, and angle of the air mobility, and transmit the signal indicative of a crash of the air mobility when the each of the factors reaches the preset values or at least two factors reach the preset values, so that the moving part 300 is inserted into the fixed part 200. Therefore, in a final crash situation where the air mobility crashes and touches the ground, as the moving part 300 is inserted into the fixed part 200, safety secure control is performed to secure the safety of the air mobility.

In the propeller safety device having the structure described above, when a crash of the air mobility occurs, the moving part 300 constituting a propeller is inserted into the fixed part 200 to allow a reduction in the total length of the propeller to prevent the propeller from hitting the ground. Accordingly, it may be possible to prevent a secondary accident that may be caused by fragments formed when the rotating propeller hits the ground.

Although exemplary embodiments of the present disclosure has been described for illustrative purposes, those skilled in the art will appreciate that various modifications, additions and substitutions are possible, without departing from the scope and spirit of the disclosure as disclosed in the accompanying claims.

What is claimed is:

1. A propeller safety device, comprising:
    a shaft generating rotating power;
    a fixed part having a sliding space therein, the fixed part having a first end coupled to the shaft, and a second end configured to be open to communicate with the sliding space;
    a moving part provided at the second end of the fixed part and configured to be pulled out of and inserted into the sliding space, and to form a blade together with the fixed part when the moving part is pulled out of the sliding space; and
    a driving module provided at the sliding space of the fixed part and connected to the moving part, and configured to allow the moving part to be inserted into the sliding space when a signal indicative of a crash of an air mobility is input,
    wherein the fixed part includes a fixed portion located in the sliding space of the fixed part, disposed in a width direction of the fixed part and fixed to the fixed part, and to which the driving module is mounted, and
    wherein the moving part has a hollow portion and an open first end such that the fixed portion of the fixed part is inserted into the hollow portion of the moving part when the moving part is inserted into the sliding space of the fixed part.

2. The propeller safety device of claim 1, wherein the fixed part includes at least one support portion protruding inward from a circumferential surface of the sliding space and connected to the fixed portion, and the moving part includes a guide slit, at an outer circumferential surface thereof, into which the support portion is inserted.

3. The propeller safety device of claim 2, wherein the support portion of the fixed part extends straightly along a longitudinal direction of the sliding space.

4. The propeller safety device of claim 1, wherein the driving module includes:
    a piston portion passing through the fixed portion with a first end thereof movably placed in the sliding space and a second end thereof connected to the moving part; and
    a launch portion provided at the fixed portion, and configured to generate explosive force when the signal indicative of the crash of the air mobility is input and allow the first end of the piston portion to be moved toward the first end of the fixed part, to insert the moving part into the sliding space of the fixed part.

5. The propeller safety device of claim 4, wherein the fixed portion is configured to close the open portion at the second end of the fixed part to seal the sliding space.

6. The propeller safety device of claim 4, wherein the piston portion has the second end thereof connected to a second end of the moving part and the first end thereof placed in the sliding space, and the first end of the piston portion is located at one side of the sliding space when the moving part is pulled out of the sliding space.

7. The propeller safety device of claim 4, wherein the launch portion is mounted to the fixed portion in the sliding space and configured to generate a gas when the signal indicative of the crash of the air mobility is input and to allow the first end of the piston portion to be moved.

8. The propeller safety device of claim 1, wherein the driving module includes:
    a moving portion passing through the fixed portion to movably place a first end thereof in the sliding space and connect a second end thereof to the moving part;
    an elastic portion disposed between the first end of the moving portion and the fixed portion and configured to be transformable elastically; and
    a stopper disposed in the sliding space of the fixed part, configured to fix a position of the moving portion by being brought into contact with the first end of the moving portion when the moving part is pulled out of the sliding space and the elastic portion is compressed, and to be separated from the first end of the moving part when the signal indicative of the crash of the air mobility is input.

9. The propeller safety device of claim 8, wherein the moving portion has the second end thereof connected to a second end of the moving part and the first end thereof placed in the sliding space and configured to be located at one side of the sliding space when the moving part is pulled out of the sliding space.

10. The propeller safety device of claim 8, wherein the elastic portion is a tension spring having a first end connected to the second end of the moving portion and a second end connected to the fixed portion.

11. The propeller safety device of claim 1, wherein the second end of the fixed part and a first end of the moving part are connected to each other in a fastening manner to maintain a pulled-out state of the moving part.

12. The propeller safety device of claim 1, further comprising:
a controller configured to receive a flight condition of the air mobility and determine whether the air mobility has crashed and configured to transmit a signal indicative of a crash of the air mobility to the driving module in response to determining that the air mobility has crashed.

13. The propeller safety device of claim 12, wherein the controller is configured to receive altitude information of the air mobility and transmit the signal indicative of the crash of the air mobility to the driving module in response to determining that an altitude of the air mobility is equal to or less than a preset altitude.

14. The propeller safety device of claim 13, wherein the controller is configured to further receive information about a fall velocity and a posture of the air mobility and to pre-store a preset velocity corresponding to the fall velocity and a preset angle corresponding to the posture of the air mobility, and in response to determining that the fall velocity is equal to or greater than the preset velocity and the posture of the air mobility is equal to or greater than the preset angle, the controller is configured to transmit the signal indicative of the crash of the air mobility to the driving module.

* * * * *